CLARIFICATION OF AQUEOUS SUSPENSIONS WITH POLYVINYL ALCOHOL-AMINO ALDEHYDE REACTION PRODUCT

Kanji Matsubayashi and Saburo Imoto, Kurashiki, Japan, assignors to Kurashiki Rayon Co., Ltd., Kurashiki-shi, Okayama Prefecture, Japan, a corporation of Japan
No Drawing. Filed Apr. 3, 1962, Ser. No. 184,687
Claims priority, application Japan, May 27, 1961, 36/18,656
10 Claims. (Cl. 210—54)

This invention relates to methods for clarification of aqueous suspensions.

According to this invention an aqueous suspension is clarified by the addition of 0.01 to 0.5% by weight of a water-soluble acetalized polyvinyl alcohol, based on the weight of suspended material in the suspension. A preferred range of acetalized polyvinyl alcohol is from 0.05 to 0.1% by weight, based on the weight of suspended material.

Suspensions which can be clarified according to the present invention include suspensions of inorganic materials, particularly soil and clay such as bentonite and kaolinite. Organic materials in suspension can also be clarified by the addition of an acetalized polyvinyl alcohol according to this invention. It is also possible to remove materials from solution by adding to the solution a water-insoluble material which adsorbs the solute and then clarifying the resulting suspension with acetalized polyvinyl alcohol.

The acetalized polyvinyl alcohol useful as a clarification agent in this invention is a water-soluble material obtained by acetalizing polyvinyl alcohol with an aminoaldehyde. Preferably the aldehyde contains no more than 24 carbon atoms, and in a preferred embodiment contains from 7 to 12 carbon atoms. Typical of the aminoaldehydes which may be used to make the acetalized polyvinyl alcohol useful in this invention are aliphatic aminoaldehydes such as $\alpha,\alpha$-dimethyl-$\beta$-dimethylaminopropionaldehyde,
$\alpha,\alpha$-dimethyl-$\beta$-diethylaminopropionaldehyde,
$\alpha,\alpha$-dimethyl-$\beta$-dibutylaminopropionaldehyde,
$\alpha,\alpha$-dimethyl-$\beta$-(2-ethylhexylamino)propionaldehyde,
$\alpha,\alpha$-dimethyl-$\beta$-dodecylaminopropionaldehyde,
$\alpha,\alpha$-dimethyl-$\beta$-octadecylaminopropionaldehyde,
$\beta$-aminobutyraldehyde,
$\beta$-cyclohexylaminobutyraldehyde, and
aromatic aminoaldehydes, such as p-aminobenzaldehyde and p-dimethylaminobenzaldehyde. Amine salt aldehydes, especially sulfates, alkyl-sulfates, and phosphates of aminoaldehydes, also can be used as acetalizing agents. Examples of these compounds include $\alpha,\alpha$-dimethyl-$\beta$-trimethylaminopropionaldehyde sulfate,
$\alpha,\alpha$-dimethyl-$\beta$-trimethylaminopropionaldehyde methylsulfate, and
$\alpha,\alpha$-dimethyl-$\beta$-trimethylaminopropionaldehyde phosphate.

The acetalized polyvinyl alcohols derived from these compounds are more water-soluble than those derived from the parent aminoaldehydes, but are generally less effective as clarifying agents. The acetalized polyvinyl alcohols which are useful in this invention can be prepared by known means, such as reaction of polyvinyl alcohol with the desired aldehyde in the presence of a mineral acid such as hydrochloric acid or sulfuric acid.

While the clarifying agents of this invention are generally formed by the reaction of polyvinyl alcohol with a single aldehyde, they may be formed by reaction of polyvinyl alcohol with two or more aldehydes.

As previously indicated the acetalized polyvinyl alcohol is water-soluble; this limits the maximum degree of acetalization, since solubility decreases as percentage acetalization increases. Usually the degree of acetalization does not exceed 15%. The minimum degree of acetalization is 1%. The degree of acetalization is the percentage of hydroxyl groups in the polyvinyl alcohol molecule which has reacted with the aldehyde.

The acetalized polyvinyl alcohols for this invention are preferably obtained from fully hydrolyzed or substantially fully hydrolyzed polyvinyl alcohol. However, it is possible to acetalize partially hydrolyzed polyvinyl alcohol having a percentage hydrolysis of approximately 80% or greater, or compounds of vinyl alcohol with various other compounds such as allyl alcohol, isopropenyl alcohol, methyl vinyl ether, provided the vinyl alcohol content of the copolymer is at least about 80 mol percent.

The effectiveness of acetalized polyvinyl alcohol as a clarifying agent is not affected by the pH of the suspension to which it is added.

This invention will now be described in greater detail with reference to a specific embodiment thereof.

EXAMPLE 1

To a 1% aqueous suspension of kalolinite adjusted to pH 6 was added 0.05% by weight, based on the weight of suspended material, of 13.8% acetalized polyvinyl alcohol made by reacting polyvinyl alcohol (D.P. 1700) with $\beta$-cyclohexylaminobutyraldehyde. The suspension was allowed to stand for 1 hour at 30° C. At the end of this time it was transparent.

EXAMPLE 2

To a 1% aqueous suspension of kaolinite adjusted to pH 6 was added 0.05% by weight, based on the weight of suspended material, of 10% acetalized polyvinyl alcohol made by reacting polyvinyl alcohol (D.P. 1700) with $\beta$-aminobutyraldehyde. About 75% of the suspended material settled out upon standing for 1 hour at 30° C.

EXAMPLE 3

To samples of a 1% aqueous suspension of kaolinite was added 13.7% acetalized polyvinyl alcohol obtained by reacting polyvinyl alcohol (D.P. 1700) with $\alpha,\alpha$-dimethyl-$\beta$-diethylaminopropionaldehyde. The suspension was allowed to stand for 1 hour at 30° C. The amount of acetalized polyvinyl alcohol added to each sample, and the percentage clarification are shown in Table 1 below:

Table 1

| Amount of acetalized polyvinyl alcohol percent: | Clarification percent |
|---|---|
| 0.06 | 97 |
| 0.1 | 99 |
| 0.25 | 100 |
| 0.5 | 99 |

EXAMPLE 4

To samples of a 1% kaolinite suspension in water adjusted to pH 6 was added polyvinyl alcohol acetalized with α,α-dimethyl-β-dodecylaminopropionaldehyde. The suspensions were allowed to stand for 1 hour at 30° C. The percentage acetalization, the amount of polyvinyl alcohol added and the percentage clarification are shown in Table 2 below:

Table 2

| Acetalization (Percent) | Amount of Acetalized Polyvinyl Alcohol (Percent) | Clarification (Percent) |
|---|---|---|
| 3 | 0.1 | 90 |
| 3 | 0.25 | 92 |
| 7 | 0.1 | 97 |
| 7 | 0.25 | 99 |
| 7 | 0.5 | 100 |
| 7 | 1.0 | 99 |

EXAMPLE 5

To a 1% aqueous suspension of kaolinite adjusted to pH 6 was added 15.8% acetalized polyvinyl alcohol made by reacting polyvinyl alcohol (D.P. 1700) with α,α-dimethyl-β-trimethylaminopropionaldehyde sulfate. The suspension was allowed to stand for 1 hour at 30° C. The amount of acetalized polyvinyl alcohol and the percentage of clarification are shown in Table 3 below:

Table 3

| Amount of acetalized polyvinyl alcohol percent: | Clarification percent |
|---|---|
| 0.05 | 97 |
| 0.1 | 99 |
| 0.25 | 100 |
| 0.5 | 100 |

EXAMPLE 6

To a 1% aqueous suspension of kaolinite adjusted to pH 6 was added 6% acetalized polyvinyl alcohol made by reacting polyvinyl alcohol (D.P. 1700) with p-dimethylaminobenzaldehyde. The suspension was allowed to stand for 1 hour at 30° C. The amount of acetalized polyvinyl alcohol and the percentage clarification are shown in Table 4 below:

Table 4

| Amount of acetalized polyvinyl alcohol percent: | Clarification percent |
|---|---|
| 0.05 | 84 |
| 0.1 | 89 |
| 0.25 | 95 |

While this invention has been described with respect to specific embodiments thereof, the scope of this invention is to be measured only by the scope of the appended claims.

We claim:

1. A process for clarifying an aqueous suspension which comprises adding to said suspension from 0.01 to 0.5%, based on the weight of suspended material, of a water-soluble acetalized polyvinyl alcohol acetalized with an aminoaldehyde wherein the degree of acetalization of the polyvinyl alcohol is at least about 1% but less than about 15%.

2. A process according to claim 1 wherein said aminoaldehyde contains not more than 24 carbon atoms.

3. A process according to claim 1 wherein the amount of acetalized polyvinyl alcohol is in the range of 0.05 to 0.1% based on the weight of suspended material.

4. A process according to claim 1 wherein said polyvinyl alcohol is prepared by the acetalization of a polyvinyl alcohol containing at least 80 mol percent of vinyl alcohol.

5. A process for clarifying an aqueous suspension of inorganic material which comprises adding to said suspension from 0.01 to 0.5%, based on the weight of suspended material, of a water-soluble acetalized polyvinyl alcohol acetalized with an aminoaldehyde wherein the degree of acetalization of the polyvinyl alcohol is at least about 1% but less than about 15%.

6. A process according to claim 5 wherein said inorganic material is clay.

7. A process according to claim 5 wherein said aminoaldehyde contains not more than 24 carbon atoms.

8. A process according to claim 5 wherein the amount of acetalized polyvinyl alcohol is in the range of 0.05 to 0.1% based on the weight of suspended inorganic material.

9. A process for clarifying an aqueous suspension of organic material which comprises adding to said suspension from 0.01 to 0.5%, based on the weight of suspended organic material, of a water-soluble acetalized polyvinyl alcohol acetalized with an aminoaldehyde wherein the degree of acetalization of the polyvinyl alcohol is at least about 1% but less than about 15%.

10. A process for clarifying an aqueous solution which comprises adding to the said solution a water-insoluble material which adsorbs the solute material and then adding to said solution containing said adsorbed solute from 0.01 to 0.5%, based on the weight of suspended material, of a water-soluble acetalized polyvinyl alcohol acetalized with an aminoaldehyde wherein the degree of acetalization of the polyvinyl alcohol is at least about 1% but less than about 15% and wherein the polyvinyl alcohol prior to acetalization contains at least about 80 mol percent of vinyl alcohol.

References Cited in the file of this patent

UNITED STATES PATENTS

| 2,138,073 | Schweitzer | Nov. 29, 1938 |
| 2,354,648 | Bond | Aug. 1, 1944 |
| 2,960,384 | Osugi et al. | Nov. 15, 1960 |
| 2,981,630 | Rowland | Apr. 25, 1961 |

FOREIGN PATENTS

| 356,408 | Great Britain | Sept. 10, 1931 |

OTHER REFERENCES

Michaels: Ind. and Eng. Chem., July 1954, vol. 46, pages 1485–90.